United States Patent
Patil et al.

(10) Patent No.: US 9,424,632 B2
(45) Date of Patent: Aug. 23, 2016

(54) SYSTEM AND METHOD FOR GENERATING HIGH DYNAMIC RANGE IMAGES

(71) Applicant: ITTIAM SYSTEMS (P) LTD., Bangalore (IN)

(72) Inventors: Arun Kumar Patil, Bangalore (IN); Sriram Sethuraman, Bangalore (IN); Tharun Battula, Karimnagar (IN); Preethi Konda, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 672 days.

(21) Appl. No.: 13/857,158

(22) Filed: Apr. 5, 2013

(65) Prior Publication Data

US 2014/0300608 A1 Oct. 9, 2014

(51) Int. Cl.
  *G06T 11/20* (2006.01)
  *G06T 5/50* (2006.01)
  *H04N 5/235* (2006.01)

(52) U.S. Cl.
  CPC ......... *G06T 5/50* (2013.01); *G06T 2207/20208* (2013.01); *H04N 5/2355* (2013.01)

(58) Field of Classification Search
  None
  See application file for complete search history.

(56) References Cited

U.S. PATENT DOCUMENTS

2005/0013501 A1* 1/2005 Kang .................... G06T 7/2066
  382/254

OTHER PUBLICATIONS

Jacobs et al. (HDR irradiance intensity exposure response curve, IEEE, pp. 84-93, Mar./Apr. 2008 vol. 28).*

* cited by examiner

*Primary Examiner* — Kyle Zhai
(74) *Attorney, Agent, or Firm* — Prakash Nama; Global IP Services, PLLC

(57) ABSTRACT

A method for generating a high dynamic range (HDR) image from images of a scene obtained at one or more exposure values is disclosed. In this embodiment, one of the obtained images is selected as a reference image. Further, mapped images are obtained by mapping pixel intensity values to corresponding irradiance values in each image. Furthermore, a pixel intensity value dependent weighting factor is determined. Moreover, a set of images is identified from the mapped images for pixels in the reference image. Also, a set of corresponding mapped pixels is established for the mapped pixels in reference image in the set of images. Further, a similarity measure is computed for the mapped pixels of reference image and corresponding mapped pixels in the set of images. Furthermore, each mapped pixel of the reference image is combined with a subset of its established corresponding mapped pixels in the set of images.

19 Claims, 4 Drawing Sheets

SYSTEM AND METHOD FOR GENERATING HIGH DYNAMIC RANGE IMAGES

TECHNICAL FIELD

Embodiments of the present subject matter relate to image processing. More particularly, embodiments of the present subject matter relate to high dynamic range (HDR) image processing.

BACKGROUND

The radiance information that can be perceived by the human eye is couple of orders higher than what a typical charge coupled device (CCD) or complementary metal-oxide-semiconductor (CMOS) sensors, in a camera phone, can capture. One existing solution for capturing higher radiance information from the scene is to take multiple images of the scene with one or more exposure values and then combine them to create a high dynamic range (HDR) image. However, this solution requires taking multiple images and there is a chance for motion to occur when taking the multiple images due to either dynamic scenes or camera shake across the multiple images. There are many existing techniques to handle the dynamic scenes and camera shake across the multiple images. However, these techniques do not guarantee perfect registration in all cases and all regions of the HDR image. Further, these techniques do not handle problems associated with the dynamic scenes, such as ghosting artifacts and the like.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for generating high dynamic range (HDR) images are disclosed. In the following detailed description of the embodiments of the present subject matter, references are made to the accompanying drawings that form a part hereof, and in which are shown by way of illustration specific embodiments in which the present subject matter be practiced. These embodiments are described in sufficient detail to enable those skilled in the art to practice the present subject matter, and it is to be understood that remaining embodiments may be utilized and that changes may be made without departing from the scope of the present subject matter. The following detailed description is, therefore, not to be taken in a limiting sense, and the scope of the present subject matter is defined by the appended claims.

Figure 1:
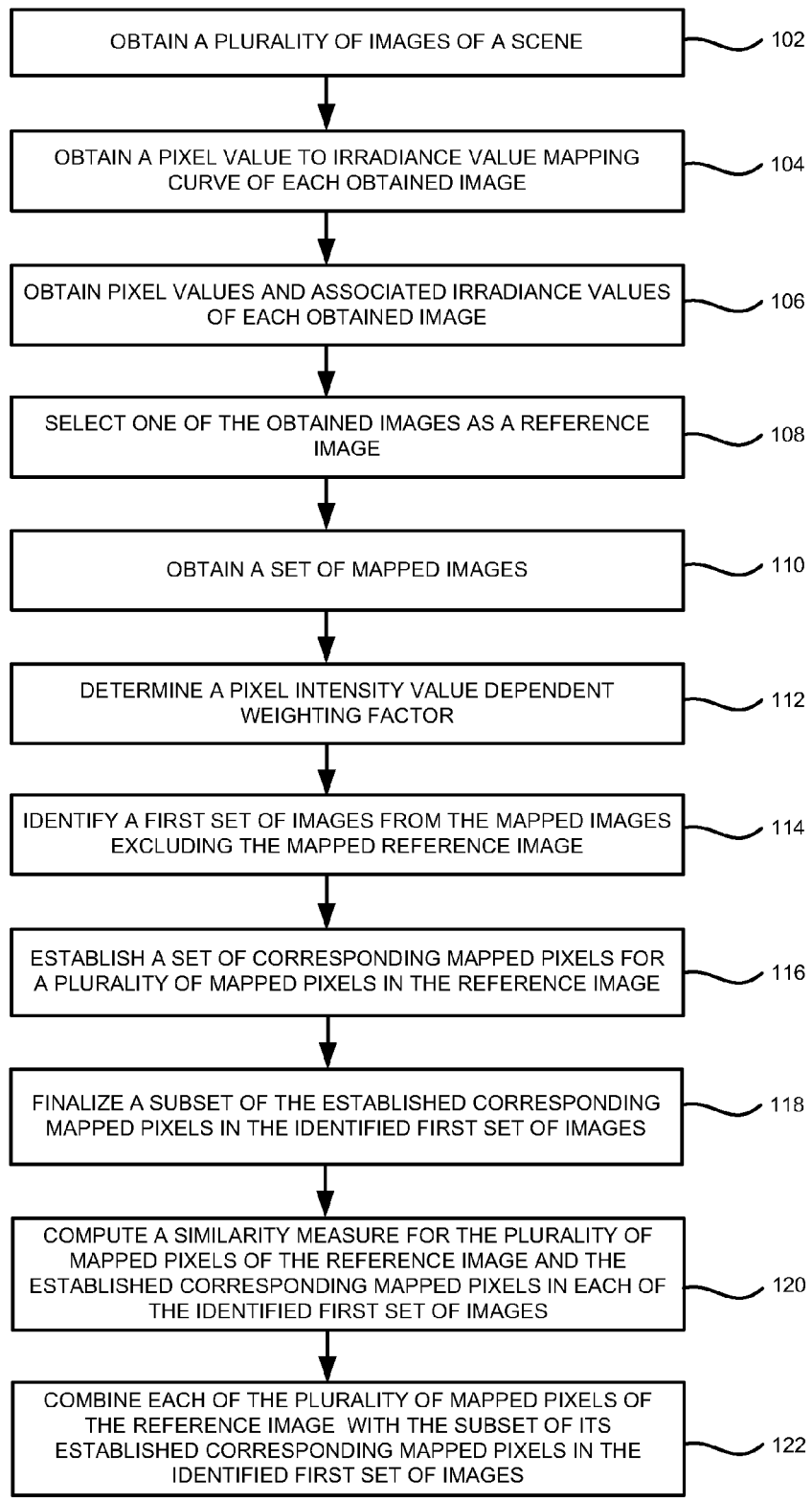
FIG. 1 illustrates a flowchart of a method for generating a high dynamic range (HDR) image, according to one embodiment.

FIG. 1 illustrates a flowchart 100 of a method for generating a HDR image, according to one embodiment. At block 102, a plurality of images of a scene are obtained at one or more exposure values using a given image capture system with a pre-determined camera response curve. At block 104, a pixel value to irradiance value mapping curve of each image is obtained using the pre-determined camera response curve of the scene and the associated exposure value. In one embodiment, a darkest image of the plurality of images is assigned an exposure value of one unit and a pixel value to irradiance value mapping curve same as the camera response curve. Further, exposure values for other images of the plurality of images are determined with respect to the exposure value of the darkest image. Furthermore, pixel value to irradiance value mapping curves of the other images are obtained using the pixel value to irradiance value mapping curve of the darkest image and associated exposure value. This is explained in more detail with reference to FIG. 2.

At block 106, pixel values and associated irradiance values of each image are obtained from the associated pixel value to irradiance value mapping curve. At block 108, one of the obtained images is selected as a reference image. In one embodiment, an auto exposure image in the obtained images is selected as the reference image. In another embodiment, an image of the obtained images with an exposure value closest to a mean of the exposure values of all the obtained images is selected as the reference image. Also in the above embodiments, as an example, a plurality of pixels is selected from different regions of the reference image based on user input. At block 110, a set of mapped images are obtained by mapping each pixel intensity value to a corresponding irradiance value in each obtained image using the pre-determined camera response curve and the relative exposure value of each obtained image with respect to the exposure value of the selected reference image. At block 112, a pixel intensity value dependent weighting factor for each possible intensity level in the images based on the pre-determined camera response curve is determined. In one embodiment, the pixel intensity value dependent weighting factors are obtained by a hat function described in FIG. 3.

At block 114, a first set of images are identified from the mapped images, excluding the mapped reference image, for a plurality of mapped pixels in the reference image based on the pixel intensity value and a relative exposure value of each mapped image with respect to the reference image. In one embodiment, if the pixel intensity value in the reference image is above 192, images with an exposure value lower than the exposure value of the reference image constitute the first set of images. Further, images with an exposure value higher than that of the reference image constitute the first set of images, if the pixel intensity value in the reference image is below 64. For any other pixel intensity value, all the mapped images other than the mapped reference image form the first set of images.

At block 116, a set of corresponding mapped pixels for each pixel of the plurality of mapped pixels in the reference image in each of the identified first set of images is established. In one embodiment, the first set of images is registered with the reference image and the collocated pixels in the first set of registered images are used as the corresponding pixels. In another embodiment, the corresponding mapped pixel for a mapped pixel in the reference image is established by matching a block of mapped pixels centered at this pixel with a block of mapped pixels in the first set of images within a predetermined search range and using a cost measure, such as sum of absolute differences and the like to arrive at a matching block.

At block 118, for each of the plurality of pixels in the mapped reference image, a subset of the established corresponding mapped pixels in the identified first set of images for that mapped reference pixel are finalized based on a comparison between the established corresponding mapped pixel's intensity value in a given image in the identified first set of images and a pixel intensity value range computed as a function of the mapped pixel' intensity value in the reference image, the pre-determined camera response curve, and the relative exposure value of the given image in the identified first set of images with respect to the exposure value of the reference image. The finalized subset is hereafter called as a second set of images.

At block 120, a similarity measure for each of the plurality of mapped pixels of the reference image and the established corresponding mapped pixels in each of the identified first set of images for that mapped pixel in the reference image is computed. In one example embodiment, normalized cross correlation (NCC) is determined over a block of pixels centered at a pixel in reference image and a same sized block centered at corresponding pixels in the identified first set of images is used for the similarity measure.

In another example embodiment, weights indicating the similarity between the mapped pixel of the reference image and the corresponding mapped pixels in each of the second set of images are generated. In one exemplary implementation, a sum of squared differences (SSD) of the mapped pixel of the reference image and the corresponding mapped pixels for each of the second set of images is determined over a block of pixels. For example, the SSD of the mapped pixel of the reference image and corresponding mapped pixels for each of the second set of images is determined over each 6×6 block. Further in this implementation, a noise variance between the mapped pixels of the reference image and each of the remaining images of the mapped images is determined over each frame. For example, the noise variance can be determined from a pair of images as the variance of the difference between the mapped pixels of the two images. Furthermore in this implementation, the weights indicating the similarity between the mapped pixel of the reference image and the corresponding mapped pixels in each of the second set of images are generated using the determined SSD and noise variance. In one example, the weights range from 0 to 1 based on the similarity between the irradiance (mapped pixel) values. For example, the weights indicating the similarity are generated using an equation:

$$wt = e^{-\left(\frac{SSD-FDV*N}{FDV*K}\right)}$$

wherein, the frame diff variance (FDV) is the noise variance, N is the block size, and K is a scale constant.

For example, one can envision that the process steps at blocks 114 to 120 can be performed without performing the process step at block 110. At block 122, each of the plurality of mapped pixels of the reference image is combined with the corresponding mapped pixels in the second set of images for that mapped pixel of the reference image based on the computed similarity measures for that mapped pixel of the reference image and the determined pixel intensity value dependent weighting factors for the mapped pixel's intensity value of the reference image and each of the corresponding mapped pixel's intensity value in each of the second set of images.

In one embodiment, for each of the plurality of mapped pixels in the reference image, a first weighted average of the mapped pixel of the reference image and the established corresponding mapped pixels in the second set of images is determined using the computed similarity measures for that mapped pixel in the reference image. In one example, the first weighted average of the mapped pixel of the reference image and the corresponding mapped pixels in the second set of images is determined using the generated weights. For example, the first weighted average is determined using an equation:

$$Rad_{robust} = \frac{1*Map_{ref}(pix_{ref}) + \sum_{i=1}^{M}(wt_i * Map_i(pix_i))}{1 + \sum_{i=1}^{M} wt_i}$$

wherein, the $Map_{ref}$ is the mapping used for the reference image pixels, $Map_i$ is the mappings for the $i^{th}$ image in the second set of images, $wt_i$ are the weights indicating the similarity between the mapped pixel of reference image and the corresponding mapped pixels of the second set of images and M is the number of the second set of images.

Further in this embodiment, for each of the plurality of mapped pixels in the reference image, a second weighted average of the corresponding mapped pixels in the established second set of images for that mapped pixel in the reference image is determined using the determined pixel intensity value dependent weighting factors and the pixel intensity values of the corresponding mapped pixels in the second set of images for that mapped pixel in the reference image. For example, the second weighted average for the mapped pixel of reference image is determined as the weighted average of the corresponding mapped pixels of the second set of images for that mapped pixel in the reference image using an equation:

$$Rad_{template} = \frac{\sum_{i=1}^{M}(pwt(Pix_i)*Map_i(Pix_i))}{\sum_{i=1}^{M} pwt(Pix_i)}$$

wherein, the pwt is a pixel intensity to weight mapping function, $Pix_{ref}$ is the pixel intensity value of the reference image and $Map_i(Pix_i)$ are the corresponding mapped pixels in the second set of images for that mapped pixel in the reference image.

Furthermore, for each of the plurality of mapped pixels of the reference image, the determined first and second weighted averages for that mapped pixel in the reference image are combined using the determined pixel intensity value based weighting factor and the pixel intensity value of that mapped pixel in the reference image. In one example, the determined first weighted average is declared as the combined irradiance value, if there are no corresponding mapped pixels in the second set of images. For example, if there exist one or more corresponding mapped pixels in the second set of images, then the combined irradiance value is computed using an equation:

$$Rad_{final}=(pwt(Pix_{ref})*Rad_{robust}+(1-(pwt(Pix_{ref}))*Rad_{template}$$

Figure 2:
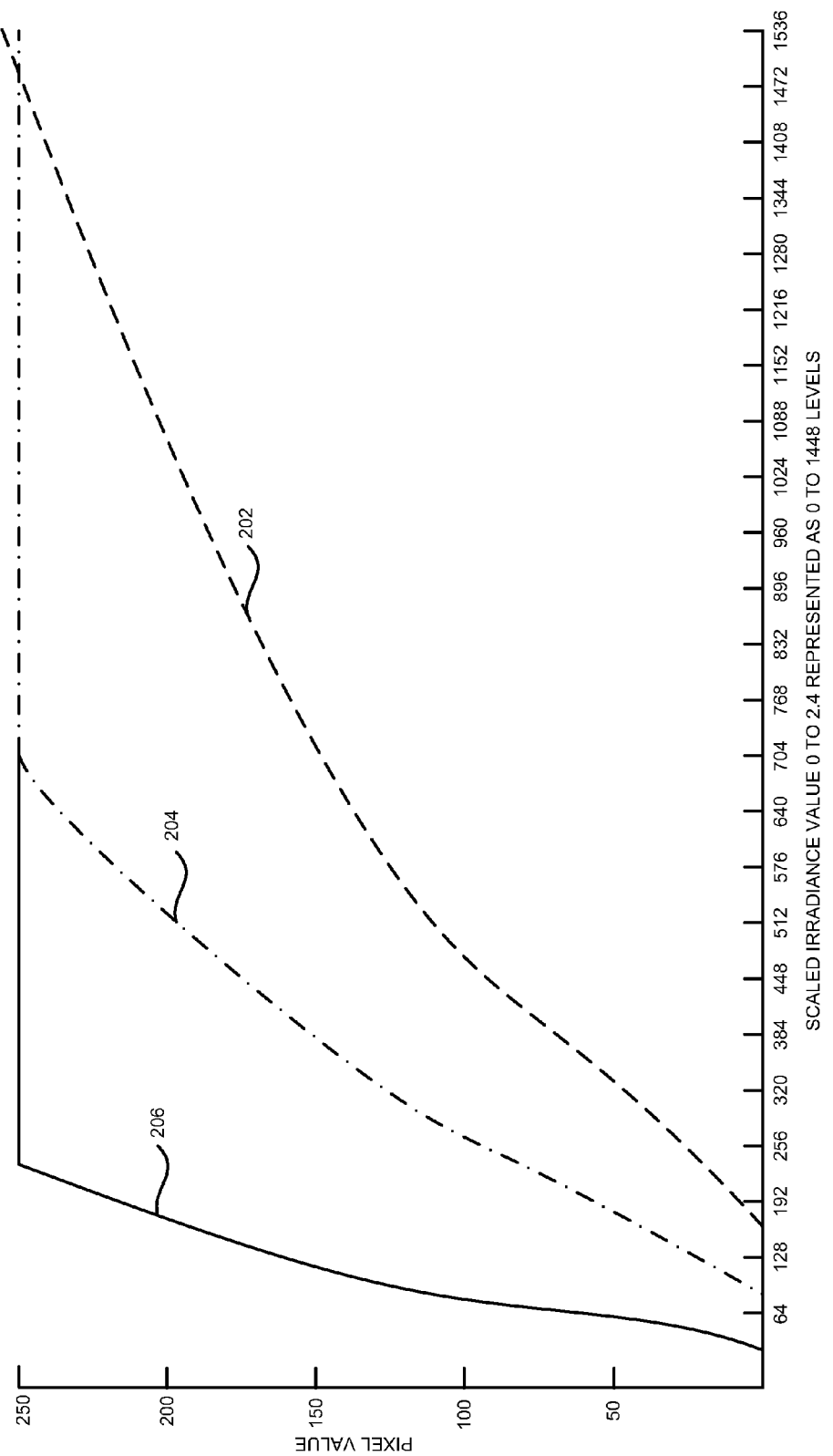
FIG. 2 is a graph illustrating pixel value to irradiance value mapping curves of a plurality of images, according to one embodiment.

Referring now to FIG. 2, which is a graph 200 illustrating pixel value to irradiance value mapping curves 202, 204, and 206 of a plurality of images, according to one embodiment. In the graph 200, x-axis indicates pixel values and y-axis indicates irradiance values. Further in the graph 200, the pixel value to irradiance value mapping curve 202 represents a darkest image of a scene having an exposure value of unity and is same as a scaled camera response curve of the scene. Furthermore, the pixel value to irradiance value mapping curve 204 represents an auto exposure image of the scene with an exposure ratio of (x/1) with respect to the darkest image. In addition, the pixel value to irradiance value mapping curve 206 represents a brightest image of the scene with an exposure ratio of (y/1) with respect to the darkest image. In one embodiment, the pixel value to irradiance mapping curves 202, 204 and 206 are scaled pixel value to irradiance value mapping curves of the images with the exposure values 1 unit, x units and y units (y>x>1). The pixel value to irradiance value mapping curves are scaled in order to bring the irradiance value and pixel value to a common scale. For example, the irradiance value is scaled using an equation:

$$\text{irradiance value\_scaled} = \frac{(\text{irradiance value} * y * 256)}{\text{Exposure at 255}}$$

Figure 3:
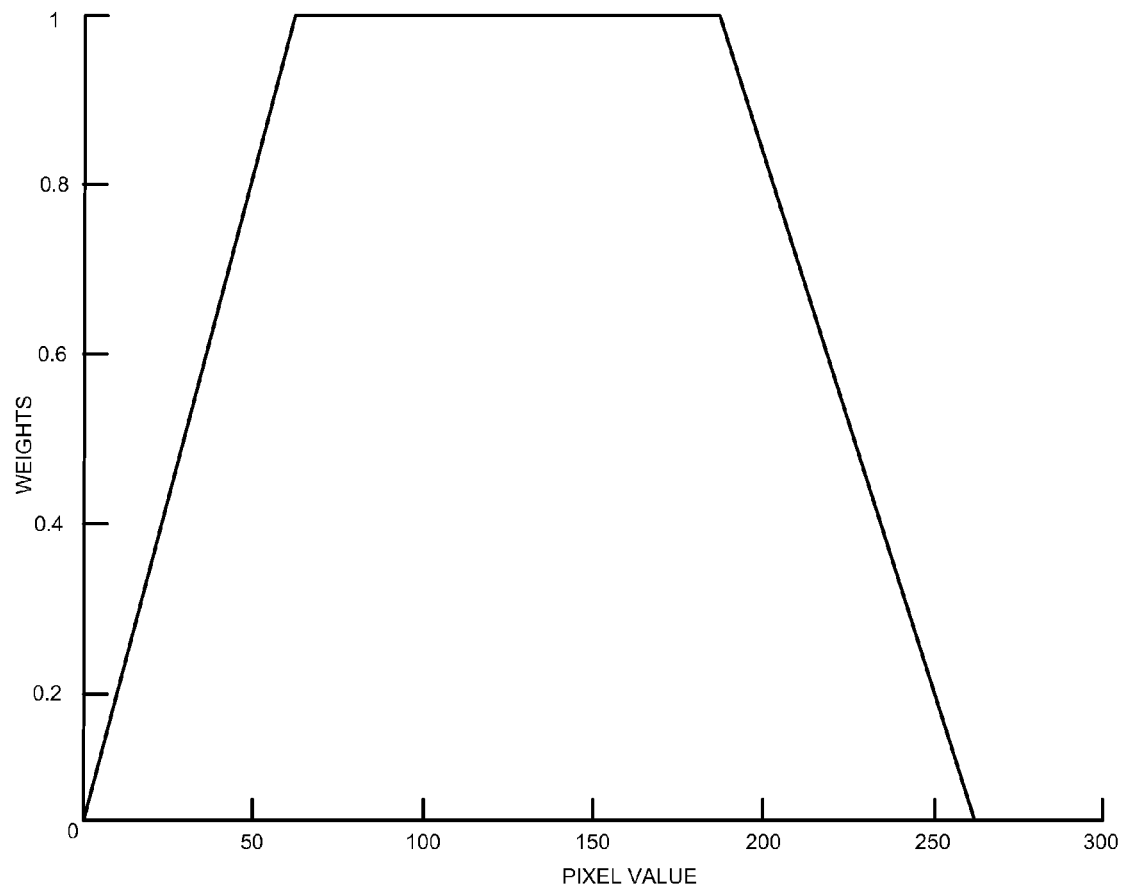
FIG. 3 is a graph illustrating weights associated with pixel values of a reference image of the plurality of images, according to one embodiment.

Referring now to FIG. 3, which is a graph 300 that illustrates weights associated with pixel values of a reference image of the plurality of images, according to one embodiment. In the graph 300, x-axis indicates the pixel values and y-axis indicates the weights. In one embodiment, the weights are assigned to each pixel value of the reference image based on determined pixel values to irradiance values mapping reliability. For example, the weights are assigned to the pixel values of the reference image based on reliability of inferring correct irradiance value from that pixel value.

Figure 4:
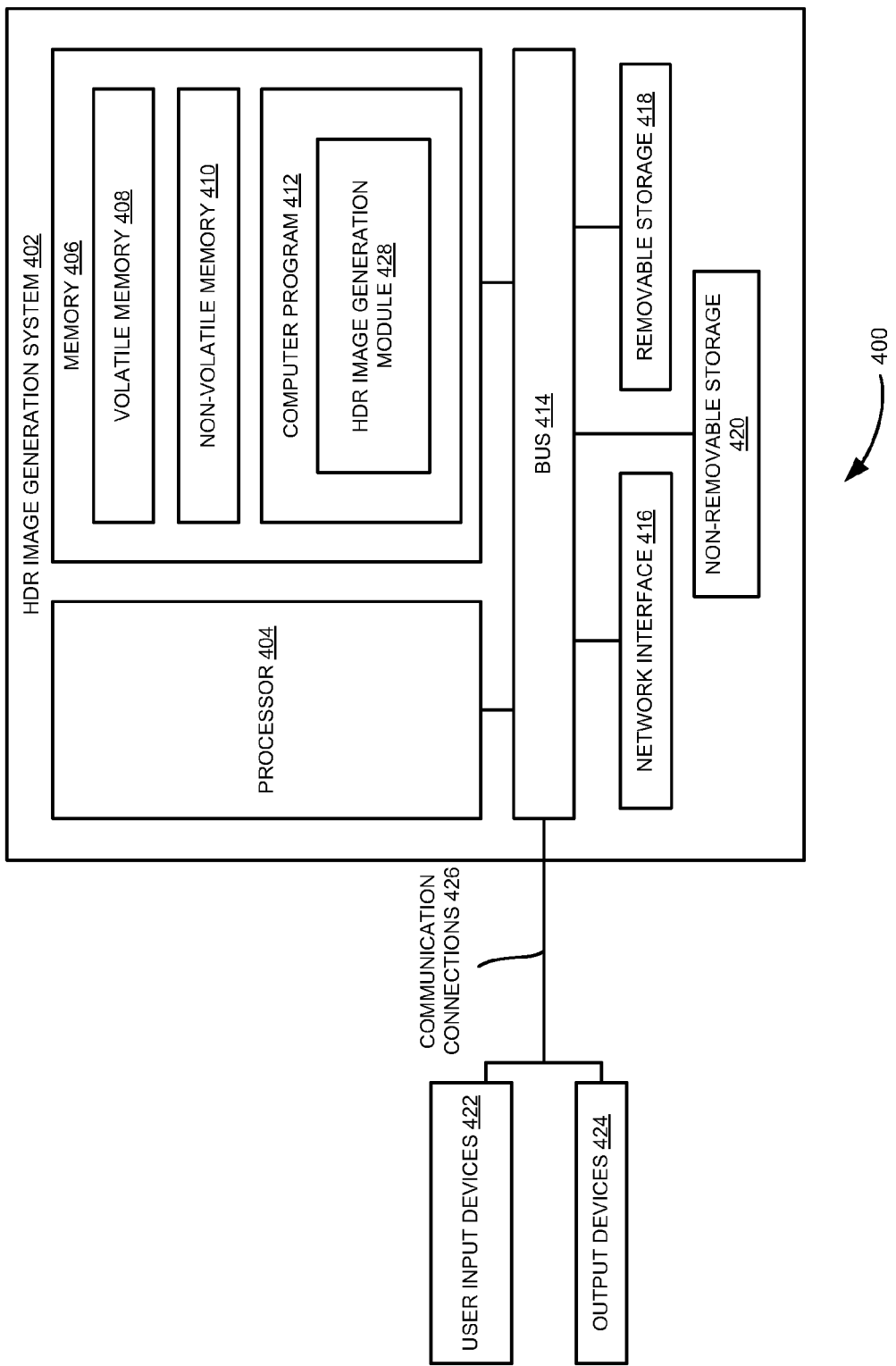
FIG. 4 illustrates a HDR image generation system for generating the HDR image, using the process of FIG. 1, according to one embodiment.

Referring now to FIG. 4, which illustrates a HDR image generation system 402 for generating the HDR image, using the process of FIG. 1, according to one embodiment. FIG. 4 and the following discussions are intended to provide a brief, general description of a suitable computing environment in which certain embodiments of the inventive concepts contained herein are implemented.

The HDR image generation system 402 includes a processor 404, a memory 406, a removable storage 418, and a non-removable storage 420. The HDR image generation system 402 additionally includes a bus 414 and a network interface 416. As shown in FIG. 4, the HDR image generation system 402 includes access to the computing system environment 400 that includes one or more user input devices 422, one or more output devices 424, and one or more communication connections 426 such as a network interface card and/or a universal serial bus connection.

Exemplary user input devices 422 include a digitizer screen, a stylus, a trackball, a keyboard, a keypad, a mouse and the like. Exemplary output devices 424 include a display unit of the personal computer, a mobile device, and the like. Exemplary communication connections 426 include a local area network, a wide area network, and/or other network.

The memory 406 further includes volatile memory 408 and non-volatile memory 410. A variety of computer-readable storage media are stored in and accessed from the memory elements of the HDR image generation system 402, such as the volatile memory 408 and the non-volatile memory 410, the removable storage 418 and the non-removable storage 420. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 404, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 404 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 404 of the HDR image generation system 402. For example, a computer program 412 includes machine-readable instructions capable for generating the HDR image of a scene, according to the teachings and herein described embodiments of the present subject matter. In one embodiment, the computer program 412 is included on a compact disk-read only memory (CD-ROM) and loaded from the CD-ROM to a hard drive in the non-volatile memory 410. The machine-readable instructions cause the HDR image generation system 402 to encode according to the various embodiments of the present subject matter.

As shown, the computer program 412 includes an HDR image generation module 428. For example, the HDR image generation module 428 can be in the form of instructions stored on a non-transitory computer-readable storage medium. The non-transitory computer-readable storage medium having the instructions that, when executed by the HDR image generation system 402, causes the HDR image generation system 402 to perform the method described in FIG. 1.

In one embodiment, the HDR image generation module 428 obtains a plurality of images of a scene at one or more exposure values using a given image capture system with a pre-determined camera response curve. Further, the HDR image generation module 428 obtains a pixel value to irradiance value mapping curve of each image using the pre-determined camera response curve of the scene and the associated exposure value. Furthermore, the HDR image generation module 428 obtains pixel values and associated irradiance values of each image from the associated pixel value to irradiance value mapping curve. In addition, the HDR image generation module 428 selects one of the obtained images as a reference image. Moreover, the HDR image generation module 428 obtains a set of mapped images by mapping each pixel intensity value to a corresponding irradiance value in each obtained image using the pre-determined camera response curve and the relative exposure value of each obtained image with respect to the exposure value of the selected reference image. Also, the HDR image generation module 428 determines a pixel intensity value dependent weighting factor for each possible intensity level in the images based on the pre-determined camera response curve.

Further, the HDR image generation module 428 identifies a first set of images from the mapped images, excluding the mapped reference image, for a plurality of mapped pixels in the reference image based on the pixel intensity value and a relative exposure value of each mapped image with respect to the reference image. Furthermore, the HDR image generation module 428 establishes a set of corresponding mapped pixels for each pixel of the plurality of mapped pixels in the reference image in each of the identified first set of images for that pixel. In addition, for each of the plurality of pixels in the mapped reference image, the HDR image generation module 428 finalizes a subset of established corresponding mapped pixels in the identified first set of images for that mapped reference pixel based on a comparison between the established corresponding mapped pixel's intensity value in a given image in the identified first set of images and a pixel intensity value range computed as a function of the mapped pixel's intensity value in the reference image, the pre-determined camera response curve, and the relative exposure value of the given image in the identified first set of images with respect to the exposure value of the reference image. The finalized subset is hereafter called as a second set of images.

Moreover, the HDR image generation module 428 computes a similarity measure for each of the plurality of mapped pixels of the reference image and the established corresponding mapped pixels in each of the identified first set of images for that mapped reference pixel. In one example embodiment, the HDR image generation module 428 determines normalized cross correlation (NCC) over a block of pixels centered at a pixel in reference image and a same sized block centered at corresponding pixels in the identified first set of images is used for the similarity measure.

In another example embodiment, the HDR image generation module 428 generates weights indicating the similarity between the mapped pixel of the reference image and the corresponding mapped pixels in each of the second set of images. In one exemplary implementation, the HDR image generation module 428 determines SSD of the mapped pixel of the reference image and the corresponding mapped pixels for each of the second set of images over a block of pixels. Further in this implementation, the HDR image generation module 428 determines a noise variance between the mapped pixels of the reference image and each of the remaining images of the mapped images over each frame. Furthermore in this implementation, the HDR image generation module 428 generates the weights indicating the similarity between the mapped pixel of the reference image and the corresponding mapped pixels in each of the second set of images using the determined SSD and noise variance. For example, the HDR image generation module 428 generates the weights indicating the similarity using an equation:

$$wt = e^{-\left(\frac{SSD - FDV*N}{FDV*K}\right)}$$

wherein, the frame diff variance (FDV) is the noise variance, N is the block size, and K is a scale constant.

In addition, the HDR image generation module 428 combines each of the plurality of mapped pixels of the reference image with the corresponding mapped pixels of the second set of images based on the computed similarity measures for that mapped pixel of the reference image and the determined pixel intensity value dependent weighting factors for the mapped pixel's intensity value in the reference image and each of the corresponding mapped pixel's intensity value in each of the second set of images. In one embodiment, for each of the plurality of mapped pixels in the reference image, the HDR image generation module 428 determines a first weighted average of the mapped pixel of the reference image and the established corresponding mapped pixels in the second set of images using the computed similarity measures for that mapped pixel in the reference image. In one example, the HDR image generation module 428 determines the first weighted average of the mapped pixel of the reference image and the corresponding mapped pixels in the second set of images using the generated weights. For example, the first weighted average is determined using an equation:

$$Rad_{robust} = \frac{1 * Map_{ref}(pix_{ref}) + \sum_{i=1}^{M}(wt_i * Map_i(pix_i))}{1 + \sum_{i=1}^{M} wt_i}$$

wherein, the $Map_{ref}$ is the mapping used for the reference image pixels, $Map_i$ is the mappings for the $i^{th}$ image in the second set of images, $wt_i$ are the weights indicating the similarity between the mapped pixel of reference image and the corresponding mapped pixels of the second set of images and M is the number of the second set of images.

Further in this embodiment, for each of the plurality of mapped pixels in the reference image, the HDR image generation module 428 determines a second weighted average of the corresponding mapped pixels in the established second set of images for that mapped pixel in the reference image using the determined pixel intensity value dependent weighting factor and the pixel intensity values of the corresponding mapped pixels in the established second set of images for that mapped pixel in the reference image. For example, the HDR image generation module 428 determines the second weighted average using an equation:

$$Rad_{template} = \frac{\sum_{i=1}^{M}(pwt(Pix_i) * Map_i(Pix_i))}{\sum_{i=1}^{M} pwt(Pix_i)}$$

wherein, the pwt is a pixel intensity to weight mapping function, $Pix_{ref}$ is the pixel intensity value of the reference image and $Map_i(Pix_i)$ are the corresponding mapped pixels in the second set of images for that mapped pixel in the reference image.

Furthermore, for each of the plurality of mapped pixels in the reference image, the HDR image generation module 428 combines the determined first and second determined weighted averages for that mapped pixel in the reference image using the determined pixel intensity value based weighting factor and the pixel intensity value of that mapped pixel in the reference image. In one embodiment, the HDR image generation module 428 declares the determined first weighted average as the combined irradiance value, if there are no corresponding mapped pixels in the second set of images. For example, if there exist one or more corresponding mapped pixels in the second set of images, then the HDR image generation module 428 computes the combined irradiance value using an equation:

$$Rad_{final} = (pwt(Pix_{ref})) * Rad_{robust} + (1 - (pwt(Pix_{ref}))) * Rad_{template}$$

In various embodiments, the systems and methods described in FIGS. 1 through 4 propose a technique for generating the HDR image by combining each of the mapped pixels of the reference image with the subset of its established corresponding mapped pixels in the identified first set of images for that mapped pixel of the reference image based on the computed similarity measures for that mapped pixel of the reference image and the determined pixel intensity value dependent weighting factors for the mapped pixel's intensity value of the reference image and each of the subset of corresponding mapped pixel's intensity value in each of the identified first set of images. Therefore, the proposed technique handles miss-registration and dynamic scenes while capturing all details of the images for the HDR image generation.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method, comprising:
    obtaining a plurality of images of a scene captured using a camera sensor at one or more exposure values with a pre-determined camera response curve;
    selecting one of the obtained images as a reference image;
    obtaining a set of mapped images by mapping each pixel intensity value to a corresponding irradiance value in each obtained image using the pre-determined camera response curve and a relative exposure value of each obtained image with respect to the exposure value of the selected reference image;
    determining a pixel intensity value dependent weighting factor based on the pre-determined camera response curve for each possible pixel intensity value in the obtained images;
    identifying a first set of images from the mapped images, excluding the mapped reference image, for a plurality of mapped pixels in the reference image based on the pixel intensity value and a relative exposure value of each mapped image with respect to the reference image;
    establishing a set of corresponding mapped pixels for the plurality of mapped pixels in the reference image in each of the identified first set of images;
    computing a similarity measure for the plurality of mapped pixels of the reference image and the established corresponding mapped pixels in each of the identified first set of images;
    finalizing a subset of the established corresponding mapped pixels in the identified first set of images that are used for combining with the plurality of mapped pixels of the reference image based on a comparison between the established corresponding mapped pixel's intensity value in a given image in the identified first set of images and a pixel intensity value range computed as a function of the mapped pixel's intensity value in the reference image, the pre-determined camera response curve, and the relative exposure of the given image in the identified first set of images with respect to the exposure value of the reference image; and
    generating a high dynamic range (HDR) image by combining each of the plurality of mapped pixels of the reference image with the subset of its established corresponding mapped pixels in the identified first set of images for that mapped pixel of the reference image based on the computed similarity measures for that mapped pixel of the reference image and the determined pixel intensity value dependent weighting factors for the mapped pixel's intensity value of the reference image and each of the subset of corresponding mapped pixel's intensity value in each of the identified first set of images, wherein the generated HDR image having a dynamic range higher than dynamic range of each of the plurality of images of the scene obtained from the camera sensor.

2. A method, comprising:
    obtaining a plurality of images of a scene captured using a camera sensor at one or more exposure values with a predetermined camera response curve;
    selecting one of the obtained images as a reference image;
    obtaining a set of mapped images by mapping each pixel intensity value to a corresponding irradiance value in each obtained image using the pre-determined camera response curve and a relative exposure value of each obtained image with respect to the exposure value of the selected reference image;
    determining a pixel intensity value dependent weighting factor based on the pre-determined camera response curve for each possible pixel intensity value in the obtained images;
    identifying a first set of images from the mapped images, excluding the mapped reference image, for a plurality of mapped pixels in the reference image based on the pixel intensity value and a relative exposure value of each mapped image with respect to the reference image;
    establishing a set of corresponding mapped pixels for the plurality of mapped pixels in the reference image in each of the identified first set of images;
    computing a similarity measure for the plurality of mapped pixels of the reference image and the established corresponding mapped pixels in each of the identified first set of images;
    for each of the plurality of mapped pixels in the reference image, determining a first weighted average of the mapped pixel of the reference image and the established corresponding mapped pixels in a second set of images using the computed similarity measures for that mapped pixel in the reference image, wherein the second set of images are a subset of the established corresponding mapped pixels in the identified first set of images for that mapped pixel in the reference image;
    for each of the plurality of mapped pixels in the reference image, determining a second weighted average of the established corresponding mapped pixels in the second set of images for that mapped pixel in the reference image using the determined pixel intensity value dependent weighting factors and the pixel intensity values of the corresponding mapped pixels in the second set of images for that mapped pixel in the reference image; and
    for each of the plurality of mapped pixels in the reference image, generating a high dynamic range (HDR) image by combining the determined first and second weighted averages for that mapped pixel in the reference image using the determined pixel intensity value based weighting factor and the pixel intensity value of that mapped pixel in the reference image, wherein the generated HDR image having a dynamic range higher than dynamic range of each of the plurality of images of the scene obtained from the camera sensor.

3. The method of claim 2, wherein computing the similarity measure for each of the plurality of mapped pixels of the reference image and the corresponding mapped pixels in each of the second set of images, comprises:
    generating weights indicating the similarity between the mapped pixel of the reference image and the corresponding mapped pixels in each of the second set of images for that mapped pixel in the reference image.

4. The method of claim 3, wherein generating the weights indicating the similarity between the mapped pixel of the reference image and corresponding mapped pixels in each of the second set of images, comprises:
  determining a sum of squared differences (SSD) of the mapped pixel of the reference image and the corresponding mapped pixels for each of the second set of images over a block of pixels;
  determining a noise variance between the plurality of mapped pixels of the reference image and each of remaining images of the mapped images over each frame; and
  generating the weights indicating the similarity between the mapped pixel of the reference image and corresponding mapped pixels in each of the second set of images using the determined SSD and noise variance.

5. The method of claim 4, wherein the weights (wt) indicating the similarity between the mapped pixel of the reference image and corresponding mapped pixels in each of the second set of images are generated using an equation:

$$wt = e^{-\left(\frac{SSD-FDV*N}{FDV*K}\right)}$$

wherein, e is an exponential function, the SSD is the sum of squared differences (SSD) of the mapped pixel of the reference image and the corresponding mapped pixels for each of the second set of images over a block of pixels, the frame diff variance (FDV) is the noise variance, N is a block size, and K is a scale constant.

6. The method of claim 5, where in the first weighted average ($Rad_{robust}$) of the mapped pixel of the reference image and the corresponding mapped pixels in the second set of images is determined using an equation:

$$Rad_{robust} = \frac{1 * Map_{ref}(pix_{ref}) + \sum_{i=1}^{M}(wt_i * Map_i(pix_i))}{1 + \sum_{i=1}^{M} wt_i}$$

wherein, the $Pix_{ref}$ is the pixel intensity value of the reference image, the $Map_{ref}$ is the mapping used for the pixels of the reference image, the $pix_i$ is the pixel intensity value of the $i^{th}$ image in the second set of images, $Map_i$ is the mappings for the $i^{th}$ image in the second set of images, and $wt_i$ are the weights indicating the similarity between the mapped pixels of the reference image and the corresponding mapped pixels of the second set of images and M is the number of the second set of images.

7. The method of claim 2, wherein the second weighted average ($Rad_{template}$) for the mapped pixel of reference image is determined as the weighted average of the corresponding mapped pixels of the second set of images for that mapped pixel in the reference image using an equation:

$$Rad_{template} = \frac{\sum_{i=1}^{M}(pwt(Pix_i) * Map_i(Pix_i))}{\sum_{i=1}^{M} pwt(Pix_i)}$$

wherein, the $Map_i(Pix_i)$ are the corresponding mapped pixels in the second set of images for that mapped pixel, in the reference image, the $pix_i$ is the pixel intensity value of the $i^{th}$ image in the second set of images, and pwt is the determined pixel intensity to weight mapping function.

8. The method of claim 2, further comprising:
  declaring the determined first weighted average as a combined irradiance value, if there are no corresponding mapped pixels in the second set of images.

9. The method of claim 2, wherein combining the first and second weighted average determined for the mapped reference pixel using the determined pixel intensity value based weighting factor and the pixel intensity value of the mapped pixel, in the reference image, if there exists the one or more corresponding mapped pixels in the second set of images, using an equation:

$$Rad_{final} = (pwt(Pix_{ref})) * Rad_{robust} + (1-(pwt(Pix_{ref}))) * Rad_{template}$$

wherein, the $Rad_{final}$ combined irradiance value of the first and second weighted average, pwt is the determined pixel intensity to weight mapping function, $Pix_{ref}$ is the pixel intensity value of the reference image, $Rad_{robust}$ is the first weighted average and $Rad_{template}$ is the second weighted average.

10. A high dynamic range (HDR) image generation system, comprising:
  a processor; and
  a memory coupled to the processor, wherein the memory includes a HDR image generation module to:
    obtain a plurality of images of a scene captured using a camera sensor at one or more exposure values with a pre-determined camera response curve;
    select one of the obtained images as a reference image;
    obtain a set of mapped images by mapping each pixel intensity value to a corresponding irradiance value in each obtained image using the pre-determined camera response curve and a relative exposure value of each obtained image with respect to the exposure value of the selected reference image;
    determine a pixel intensity value dependent weighting factor based on the pre-determined camera response curve for each possible pixel intensity value in the obtained images;
    identify a first set of images from the mapped images, excluding the mapped reference image, for a plurality of mapped pixels in the reference image based on the pixel intensity value and a relative exposure value of each mapped image with respect to the reference image;
    establish a set of corresponding mapped pixels for the plurality of mapped pixels in the reference image in each of the identified first set of images;
    compute a similarity measure for the plurality of mapped pixels of the reference image and the established corresponding mapped pixels in each of the identified first set of images;
    finalize a subset of the established corresponding mapped pixels in the identified first set of images that are used for combining with the plurality of mapped pixels of the reference image based on a comparison between the established corresponding mapped pixel's intensity value in a given image in the identified first set of images and a pixel intensity value range computed as a function of the mapped pixel's intensity value in the reference image, the pre-determined camera response curve, and the relative exposure of the given image in the identified first set of images with respect to the exposure value of the reference image; and generate a HDR image by combining each of the plurality of mapped pixels of the reference image with the subset of its established corresponding mapped pixels in the identified first set of images for that mapped pixel of the reference image based on the computed similarity measures for that mapped pixel of the reference image and the determined pixel intensity value dependent weighting factors for the mapped pixel's intensity value of the reference image and each of the subset of corresponding mapped pixel's intensity value in each of the identified first set of images, wherein the generated HDR image having a dynamic range higher than dynamic range of each of the plurality of images of the scene obtained from the camera sensor.

11. A high dynamic range (HDR) image generation system, comprising:
a processor; and
a memory coupled to the processor, wherein the memory includes a HDR image generation module to:
  obtain a plurality of images of a scene captured using a camera sensor t one or more exposure values with a pre-determined camera response curve;
  select one of the obtained images as a reference image;
  obtain a set of mapped images by mapping each pixel intensity value to a corresponding irradiance value in each obtained image using the pre-determined camera response curve and a relative exposure value of each obtained image with respect to the exposure value of the selected reference image;
  determine a pixel intensity value dependent weighting factor based on the pre-determined camera response curve for each possible pixel intensity value in the obtained images;
  identify a first set of images from the mapped images, excluding the mapped reference image, for a plurality of mapped pixels in the reference image based on the pixel intensity value and a relative exposure value of each mapped image with respect to the reference image;
  establish a set of corresponding mapped pixels for the plurality of mapped pixels in the reference image in each of the identified first set of images;
compute a similarity measure for the plurality of mapped pixels of the reference image and the established corresponding mapped pixels in each of the identified first set of images;
  for each of the plurality of mapped pixels in the reference image, determine a first weighted average of the mapped pixel of the reference image and the established corresponding mapped pixels in a second set of images using the computed similarity measures for that mapped pixel in the reference image, wherein the second set of images are a subset of the established corresponding mapped pixels in the identified first set of images for that mapped pixel in the reference image;
  for each of the plurality of mapped pixels in the reference image, determine a second weighted average of the established corresponding mapped pixels in the second set of images for that mapped pixel in the reference image using the determined pixel intensity value dependent weighting factors and the pixel intensity values of the corresponding mapped pixels in the second set of images for that mapped pixel in the reference image; and
  for each of the plurality of mapped pixels in the reference image, generate the HDR image by combining the determined first and second weighted averages for that mapped pixel in the reference image using the determined pixel intensity value based weighting factor and the pixel intensity value of that mapped pixel in the reference image, wherein the generated HDR image having a dynamic range higher than dynamic range of each of the plurality of images of the scene obtained the camera sensor.

12. The system of claim 11, wherein the HDR image generation module is configured to:
  generate weights indicating the similarity between the mapped pixel of the reference image and the corresponding mapped pixels in each of the second set of images for that mapped pixel in the reference image.

13. The system of claim 12, wherein the HDR image generation module is configured to:
  determine a sum of squared differences (SSD) of the mapped pixel of the reference image and the corresponding mapped pixels for each of the second set of images over a block of pixels;
  determine a noise variance between the plurality of mapped pixels of the reference image and each of remaining images of the mapped images over each frame; and
  generate the weights indicating the similarity between the mapped pixel of the reference image and corresponding mapped pixels in each of the second set of images using the determined SSD and noise variance.

14. The system of claim 13, wherein the HDR image generation module generates the weights (wt) indicating the similarity between the mapped pixel of the reference image and corresponding mapped pixels in each of the second set of images using an equation:

$$wt = e^{-\left(\frac{SSD-FDV*N}{FDV*K}\right)}$$

wherein, e is the exponential function, SSD is the sum of squared differences (SSD) of the mapped pixel of the reference image and the corresponding mapped pixels for each of the second set of images over a block of pixels, the frame diff variance (FDV) is the noise variance, N is a block size, and K is a scale constant.

15. The system of claim 14, where in HDR image generation module determines the first weighted average ($Rad_{robust}$) of the mapped pixel of the reference image and the corresponding mapped pixels in the second set of images using an equation:

$$Rad_{robust} = \frac{1 * Map_{ref}(pix_{ref}) + \sum_{i=1}^{M} (wt_i * Map_i(pix_i))}{1 + \sum_{i=1}^{M} wt_i}$$

wherein, the $Pix_{ref}$ is the pixel intensity value of the reference image, the $Map_{ref}$ is the mapping used for the pixels of the reference image, the $pix_i$ is the pixel intensity value of the $i^{th}$ image in the second set of images, $Map_i$ is the mappings for the $i^{th}$ image in the second set of images, $wt_i$ are the weights indicating the similarity between the mapped pixel of the reference image and the corresponding mapped pixels of the second set of images and M is the number of the second set of images.

16. The system of claim 11, wherein the HDR image generation module determines the second weighted average ($Rad_{template}$) for the mapped pixel of the reference image as the weighted average of the corresponding mapped pixels of the second set of images for that mapped pixel in the reference image using an equation:

$$Rad_{template} = \frac{\sum_{i=1}^{M}(pwt(Pix_i)*Map_i(Pix_i))}{\sum_{i=1}^{M}pwt(Pix_i)}$$

wherein, the $Map_i(Pix_i)$ are the corresponding mapped pixels in the second set of images for that mapped pixel in the reference image, the $pix_i$ is the pixel intensity value of the $i^{th}$ image in the second set of images, and pwt is the determined pixel intensity to weight mapping function.

17. The system of claim 11, wherein the HDR image generation module is further configured to:
declare the determined first weighted average as a combined irradiance value, if there are no corresponding mapped pixels in the second set of images.

18. The system of claim 11, wherein the HDR image generation module combines the first and second weighted average determined for the mapped reference pixel, if there exists the one or more corresponding mapped pixels in the second set of images, using an equation:

$Rad_{final} = (pwt(Pix_{ref}))*Rad_{robust} + (1-(pwt(Pix_{ref})))*Rad_{template}$ wherein, the $Rad_{final}$ is the combined irradiance value of the first and second weighted average, the pwt is the determined pixel intensity to weight mapping function, $Pix_{ref}$ is the pixel intensity value of the reference image, $Rad_{robust}$ is the first weighted average and $Rad_{template}$ is the second weighted average.

19. A non-transitory computer-readable storage medium having instructions that, when executed by a computing device, cause the computing device to:
obtain a plurality of images of a scene captured using a camera sensor at one or more exposure values with a pre-determined camera response curve;
select one of the obtained images as a reference image;
obtain a set of mapped images by mapping each pixel intensity value to a corresponding irradiance value in each obtained image using the pre-determined camera response curve and a relative exposure value of each obtained image with respect to the exposure value of the selected reference image;
determine a pixel intensity value dependent weighting factor based on the pre-determined camera response curve for each possible pixel intensity value in the obtained images;
identify a first set of images from the mapped images, excluding the mapped reference image, for a plurality of mapped pixels in the reference image based on the pixel intensity value and a relative exposure value of each mapped image with respect to the reference image;
establish a set of corresponding mapped pixels for the plurality of mapped pixels in the reference image in each of the identified first set of images;
compute a similarity measure for the plurality of mapped pixels of the reference image and the established corresponding mapped pixels in each of the identified first set of images;
finalize a subset of the established corresponding mapped pixels in the identified first set of images that are used for combining with the plurality of mapped pixels of the reference image based on a comparison between the established corresponding mapped pixel's intensity value in a given image in the identified first set of images and a pixel intensity value range computed as a function of the mapped pixe's intensity value in the reference image, the pre-determined camera response curve, and the relative exposure of the given image in the identified first set of images with respect to the exposure value of the reference image; and
generate a high dynamic range (HDR) image by combining each of the plurality of mapped pixels of the reference image with the subset of its established corresponding, mapped pixels in the identified first set of images for that mapped pixel of the reference image based on the computed similarity measures for that mapped pixel of the reference imago and the determined pixel intensity value dependent weighting factors for the mapped pixel's intensity value of the reference image and each of the subset of corresponding mapped pixel's intensity value in each of the identified first set of images, wherein the generated HDR image having a dynamic range higher than dynamic range of each of the plurality of images of the scene obtained from the camera sensor.

* * * * *